(12) United States Patent
Park et al.

(10) Patent No.: US 7,239,109 B2
(45) Date of Patent: Jul. 3, 2007

(54) SINGLE-PHASE INDUCTION MOTOR

(75) Inventors: Jin Soo Park, Inchun-si (KR); Byung Taek Kim, Ansan-si (KR); Sung Ho Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 11/202,161

(22) Filed: Aug. 12, 2005

(65) Prior Publication Data
US 2006/0038528 A1 Feb. 23, 2006

(30) Foreign Application Priority Data
Aug. 17, 2004 (KR) .................... 10-2004-0064803

(51) Int. Cl.
*H02P 1/42* (2006.01)
(52) U.S. Cl. ............... 318/789; 318/793; 318/772; 318/786; 318/774; 318/767
(58) Field of Classification Search .......... 318/789, 318/793, 772, 786, 774, 775, 767, 816, 790
See application file for complete search history.

(56) References Cited

U.S. PATENT DOCUMENTS

| 3,303,402 | A | | 2/1967 | Martin et al. | |
|---|---|---|---|---|---|
| 3,809,937 | A | | 5/1974 | Koike | |
| 4,107,583 | A | * | 8/1978 | Houtman | 318/781 |
| 4,119,894 | A | | 10/1978 | Sorensen | |
| 4,322,665 | A | * | 3/1982 | Landgraf | 318/774 |
| 4,387,330 | A | | 6/1983 | Zigler | |
| 4,388,581 | A | * | 6/1983 | Bhatnagar | 318/789 |
| 2003/0107286 | A1 | | 6/2003 | Machado et al. | |
| 2005/0253549 | A1 | | 11/2005 | Min et al. | |

FOREIGN PATENT DOCUMENTS

| EP | 0412201 | 2/1991 |
|---|---|---|
| JP | 1-268468 | 10/1989 |
| JP | 2003-189564 | 7/2003 |
| KR | 20-1994-0018115 | 7/1994 |

OTHER PUBLICATIONS

English Language Abstract of EP 0412201.
English Language Abstract of JP 2003-189564.
English Language Abstract of JP 1-268468.

* cited by examiner

*Primary Examiner*—Karen Masih
(74) *Attorney, Agent, or Firm*—Greenblum & Bernstein, P.L.C.

(57) ABSTRACT

A single-phase induction motor includes a main winding, an auxiliary winding, a run capacitor, and a subsidiary start device. The auxiliary winding is configured such that the number of turns of the auxiliary winding, through which a current flows, varies according to the operating mode of the motor. When the motor starts, the number of turns of the auxiliary winding, through which a current flows, is reduced, thereby increasing the start efficiency of the motor. When the motor runs in normal mode, the number of turns of the auxiliary winding, through which a current flows, is increased, thereby increasing the operational efficiency of the motor.

15 Claims, 5 Drawing Sheets

SINGLE-PHASE INDUCTION MOTOR

BACKGROUND OF THE INVENTION

1. Field of the Invention

The present invention relates to a single-phase induction motor, and more particularly to a single-phase induction motor, which changes the number of turns of an auxiliary winding, through which a current flows, according to the operating mode of the motor, thereby increasing both the start torque performance when the motor starts and the efficiency of the motor when the motor runs in normal mode.

2. Description of the Related Art

A single-phase induction motor is a device that produces an alternating current on a winding installed on a stator, and produces an alternating magnetic field according to the current variation, thereby applying a torque to the rotor and thus obtaining a rotating force.

However, in the case where the motor receives single-phase AC power from a driving power source, the motor simply produces an alternating magnetic field in the axis direction of the winding, and thus it is not able to produce a rotating force. A start device is installed in the motor to start the motor. Typically, a capacitor-based start device is used as the start device.

FIG. 1 is a circuit diagram of a conventional single-phase induction motor. As shown in FIG. 1, the conventional single-phase induction motor is driven by a power source E, and includes a main winding M, an auxiliary winding S, a run capacitor Cr connected in series with the auxiliary winding S, and a subsidiary start device connected in parallel with the run capacitor Cr. The subsidiary start device is generally composed of a Positive Thermal coefficient element (hereinafter referred to as a "PTC") 50. The PTC 50 is an element whose resistance varies according to temperature. The PTC 50 has a high resistance at high temperatures and has a low resistance at low temperatures.

The single-phase induction motor further includes a rotor 20, which is shown as a circle between the windings M and S in FIG. 2. A start capacitor (not shown) may be connected in series with the subsidiary start device.

The single-phase induction motor configured as described above operates in the following manner.

As the power source E supplies power to the motor, a current Im flows to the main winding M, so that the main winding M produces a main alternating magnetic field. Also, a current Is, whose phase is shifted by the run capacitor Cr, flows to the auxiliary winding S, so that the auxiliary winding S produces an auxiliary alternating magnetic field whose phase is different from the main alternating magnetic field produced by the main winding M. As the auxiliary winding S produces the auxiliary magnetic field with a different phase from the main magnetic field, a rotating magnetic field is produced, so that torque is applied to the rotor 20, thereby rotating the rotor 20.

In addition, since the PTC 50, which is used as a subsidiary start device, has a relatively low resistance when the motor starts, most of the current Is passing through the auxiliary winding S flows through the PTC 50 when the motor starts, thereby increasing the start efficiency of the motor.

On the other hand, when the motor runs in normal mode after a predetermined time from the start of the motor, the PTC 50 has a very high resistance, thereby opening a connection line, through which the PTC 50 is connected to the circuit, and thus preventing current from flowing to the PTC 50.

Accordingly, most of the current Is passing through the auxiliary winding Is flows through the run capacitor Cr, so that the rotor 20 rotates at synchronous speed due to the interaction between the rotor 20 and the magnetic fields produced by the main winding M, the auxiliary winding S and the run capacitor Cr.

FIG. 2 is a circuit diagram illustrating the connection state of wires of an auxiliary winding of a conventional single-phase induction motor. The conventional single-phase induction motor includes a stator 30 having a number of slots 1 to 14 and 1' to 14'. A coil is wound on the stator 30 through the slots 1 to 14 and 1' to 14' to form a main winding and an auxiliary winding. The auxiliary winding includes two coils connected in parallel. The first coil (n3 to n7) of the auxiliary winding is formed by winding turns n3 to n7 on the stator 20 through slots 12, 3, 11, 4, . . . in the named order. The second coil (n3' to n7') is formed by winding turns n3' to n7' on the stator 20 through slots 12', 3', 11', 4' . . . in the named order. The two coils of the auxiliary winding are connected in parallel by connecting both ends of the first coil (n3 to n7) of the auxiliary winding respectively with both ends of the second coil (n3' to n7') thereof.

The run capacitor Cr is connected between the power source E and one-side ends of the two parallel coils of the auxiliary winding. The PTC 50 is connected in parallel with the run capacitor Cr. As a rotating magnetic field is produced by a current flowing through the coils, a rotating force is applied to the rotor 20, thereby rotating the rotor 20. In order to transfer the rotating force to the outside of the motor, a shaft 40 is placed in the rotor 20 at the center thereof so that it is oriented in the direction parallel to the axis of the rotor 20.

Both the operational and start efficiencies of the conventional single-phase induction motor have a significant influence on the performance of the motor. However, the operational and start efficiencies depend on the number of turns of the auxiliary winding. Specifically, if the number of turns of the auxiliary winding is large, the operational efficiency of the motor is increased but the start efficiency thereof is reduced. On the contrary, if the number of turns of the auxiliary winding is small, the start efficiency of the motor is increased but the operational efficiency thereof is reduced.

The conventional single-phase induction motor cannot achieve satisfactory start and operational efficiencies at the same time since the number of turns of the auxiliary winding is constant from when the motor starts running to when the motor stops running.

SUMMARY OF THE INVENTION

Therefore, the present invention has been made in view of the above problems, and it is an object of the present invention to provide a single-phase induction motor, in which the number of turns of an auxiliary winding, through which a current flows, is changed appropriately according to the operating state of the motor while the motor runs, thereby achieving satisfactory start and operational efficiencies of the motor at the same time.

In accordance with one aspect of the present invention, the above and other objects can be accomplished by the provision of a single-phase induction motor comprising a main winding, an auxiliary winding, a run capacitor, and a subsidiary start device, wherein the auxiliary winding is configured so that the number of turns thereof, through which a current flows, varies depending on operating states of the motor in order to increase start and operational efficiencies of the motor.

Preferably, the auxiliary winding is configured so that the number of turns thereof, through which a current flows, is reduced when the motor starts in order to increase the start efficiency of the motor, and the number of turns thereof, through which a current flows, is increased when the motor runs in normal mode in order to increase the operational efficiency of the motor.

Preferably, the auxiliary winding comprises a first auxiliary winding portion and a second auxiliary winding portion, the second auxiliary winding portion being formed by additionally winding a coil from an end of the first auxiliary winding portion. In addition, the run capacitor is connected in series with the auxiliary winding, and the subsidiary start device is connected in parallel with both the run capacitor and the second auxiliary winding portion.

Preferably, the subsidiary start device comprises a variable resistance element having a low equivalent resistance when the motor starts and having a high equivalent resistance when the motor runs in normal mode, so that the direction of the flow of a current passing through the auxiliary winding can be changed according to the operating state of the motor.

Preferably, a Positive Thermal Coefficient (PTC) element, a centrifugal switch, or a relay, which is a variable resistance element, can be used as the subsidiary start device.

In accordance with another aspect of the present invention, there is provided a single-phase induction motor comprising a rotor; a stator having a plurality of slots formed therein; and main and auxiliary windings being formed on the stator through the slots, wherein the auxiliary winding is installed in the form of two parallel coils on the stator through the slots, and the auxiliary winding comprises a first auxiliary winding portion and a second auxiliary winding portion, the second auxiliary winding portion being formed by additionally winding a coil from one end of the first winding portion.

Preferably, the auxiliary winding is formed by connecting the first auxiliary winding portion with the second auxiliary winding portion through a tap. In addition, the may further comprises a run capacitor connected in series with the auxiliary winding; and a subsidiary start device connected in parallel with both the run capacitor and the second auxiliary winding portion.

Preferably, a Positive Thermal Coefficient (PTC) element, a centrifugal switch, or a relay, which is a variable resistance element, can be used as the subsidiary start device.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
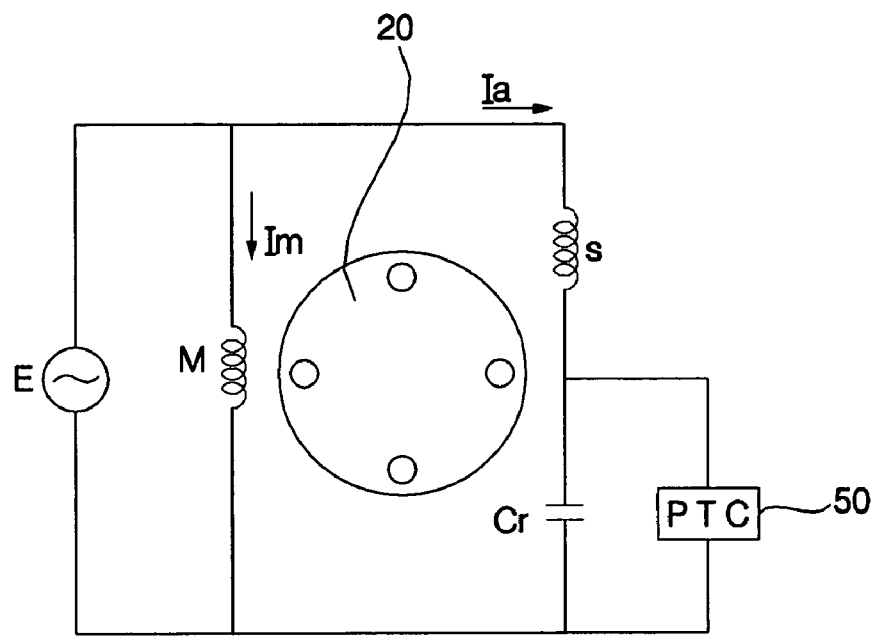
FIG. 1 is a circuit diagram of a conventional single-phase induction motor.
Figure 2:
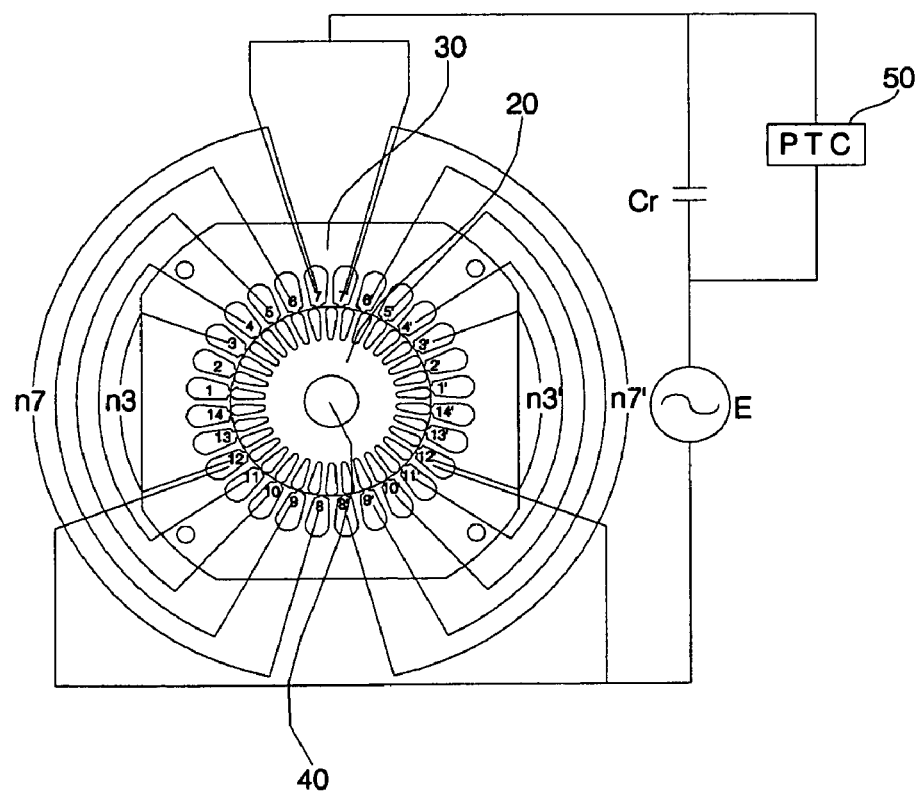
FIG. 2 is a circuit diagram illustrating the connection state of wires of an auxiliary winding of a conventional single-phase induction motor.

Embodiments of a single-phase induction motor according to the present invention will now be described in detail with reference to the accompanying drawings. The same or similar elements are referred to by the same terms in the description of the embodiments and they are also denoted by the same reference numerals in the drawings.

Figure 3:
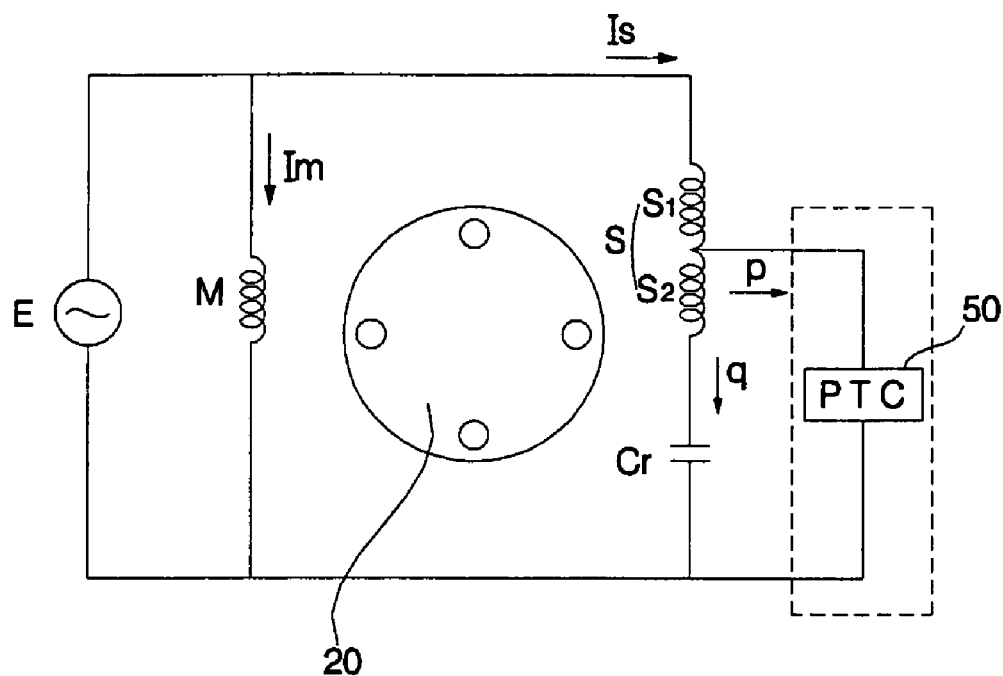
FIG. 3 is a circuit diagram of a single-phase induction motor according to the present invention.
Figure 4:
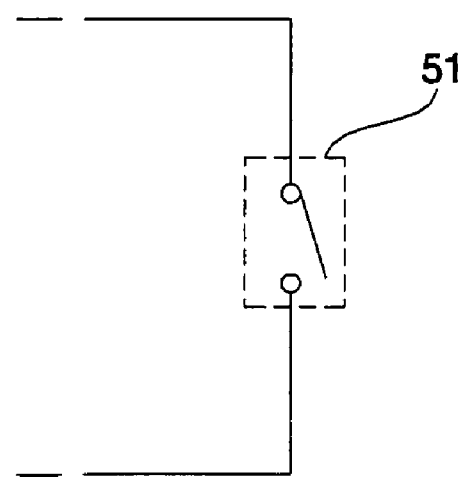
FIGS. 4 and 5 are diagrams illustrating subsidiary start devices that can be used instead of a PTC shown in FIG. 3 according to the present invention.
Figure 5:
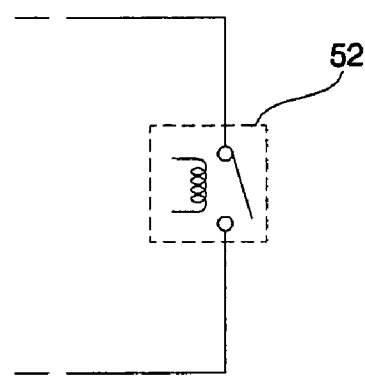

FIG. 3 is a circuit diagram of a single-phase induction motor according to the present invention, and FIGS. 4 and 5 are diagrams illustrating subsidiary start devices that can be used instead of a PTC 50 shown in FIG. 3.

As shown in FIG. 3, the single-phase induction motor includes a main winding M, an auxiliary winding S, a run capacitor Cr, and a subsidiary start device. The main winding M produces a main magnetic field, and the auxiliary winding S, which is connected in parallel with the main winding M, produces an auxiliary magnetic field. The run capacitor Cr is connected in series with the auxiliary winding S so that the phase of a current flowing through the auxiliary winding S has a predetermined difference with the phase of a current flowing through the main winding M, and thus the phase of the auxiliary magnetic field has a predetermined difference with the phase of the main magnetic field. The subsidiary start device is connected in parallel with the run capacitor Cr. In this example, the subsidiary start device includes a PTC 50.

In particular, the auxiliary winding S includes a first auxiliary winding portion S1, and a second auxiliary winding portion S2 that is formed by additionally winding a coil connected to and extending from the end of the first auxiliary winding portion S1. The run capacitor C4 is formed on a connection line connected to and extending from the end of the second auxiliary winding portion S2 so that the run capacitor C4 is connected in series with the auxiliary winding S through the connection line. The PTC 50 is formed on a connection line connected to and extending from the end of the first auxiliary winding portion S1 so that the PTC 50 is connected in parallel with the run capacitor Cr.

The PTC 50, which is used as the subsidiary start device, is an element whose resistance varies depending on temperature. The PTC 50 has a low resistance at low temperatures when the motor starts rotating. When a current flows through the motor for a predetermined time after the start of the motor, the temperature of the PTC 50 is increased so that the PTC 50 has a very high resistance, thereby opening a start device connection line, through which the PTC 50 is connected with the circuit, and thus preventing current from flowing to the PTC 50.

Instead of the PTC 50, either a centrifugal switch 51 shown in FIG. 4 or a relay 52 shown in FIG. 5 can be used as the subsidiary start device.

The operation of the single-phase induction motor will now be described in detail with reference to FIGS. 3 to 5.

As a power source E supplies drive power to the motor, a current Im and a current Is flow to the main winding M and the auxiliary winding S, respectively.

When the motor starts, the equivalent resistance of the PTC 50 is very low. Accordingly, most of the current Is provided to the auxiliary winding S flows (in a first direction "p") to the PTC 50, which is formed on the start device connection line connected with the end of the first winding S1, after passing through the first auxiliary winding portion S1.

On the other hand, when the motor runs in normal mode, the equivalent resistance of the PTC 50 is very high due to increased temperature of the PTC 50, thereby opening the start device connection line and thus preventing current from flowing to the PTC 50.

Accordingly, when the motor runs in normal mode, most of the current Is provided to the auxiliary winding S flows (in a second direction "q") to the run capacitor Cr, which is formed on the connection line connected with the end of the second winding S2, after sequentially passing through the first and second auxiliary winding portions S1 and S2.

As described above, when the motor starts, due to a very low resistance of the PTC 50, most of the current Is provided to the auxiliary winding S flows to the PTC 50, which is formed on the start device connection line connected with the end of the first winding S1, after passing through the first auxiliary winding portion S1. Since when the motor starts, most of the current Is flows to the PTC 50 via the first auxiliary winding portion S1 alone, regardless of the second auxiliary winding portion S2 added to the auxiliary winding S2, the single-phase induction motor according to the present invention can have the same effect as when the auxiliary winding S has a small number of turns, consequently improving the startup efficiency of the motor.

On the other hand, as described above, when the motor runs in normal mode, the PTC 50 has a very high resistance due to increased temperature of the PTC 50, thereby opening the start device connection line, through which the PTC 50 is connected to the circuit, and thus preventing current from flowing to the PTC 50. Accordingly, the direction of the flow of the current Is, which was flowing to the PTC 50 in the first direction "p" via the first auxiliary winding portion S1, is switched to the second direction "q" so that the current Is flows to the run capacitor Cr through the second auxiliary winding portion S2 via the end of the first auxiliary winding portion S1.

Since when the motor runs in normal mode, the current Is flows through the entirety of the auxiliary winding S including the first and second auxiliary winding portions S1 and S2, the single-phase induction motor according to the present invention can have the same effect as when the auxiliary winding S has a large number of turns, consequently improving the operational efficiency of the motor.

That is, the single-phase induction motor according to the present invention changes the number of turns of the auxiliary winding S, through which a current flows, to a suitable number of turns according to the operating mode of the motor. Specifically, when the motor is in start mode, the motor allows a current to flow through a small number of turns of the auxiliary winding S. On the other hand, when the motor is in normal running mode, the motor allows a current to flow through a large number of turns of the auxiliary winding S. The change of the number of turns of the auxiliary winding, through which a current flows, according to the present invention increases both the start and operational efficiencies of the motor.

Instead of the PTC 50, any other variable resistance element, whose resistance varies depending on the operating state of the motor (for example, the element has a low equivalent resistance when the motor starts and has a high equivalent resistance when the motor runs in normal mode), can be used as the subsidiary start device. For example, any one of the centrifugal switch 51 and the relay 52, which are variable resistance elements, can be used as the subsidiary start device.

Figure 6:
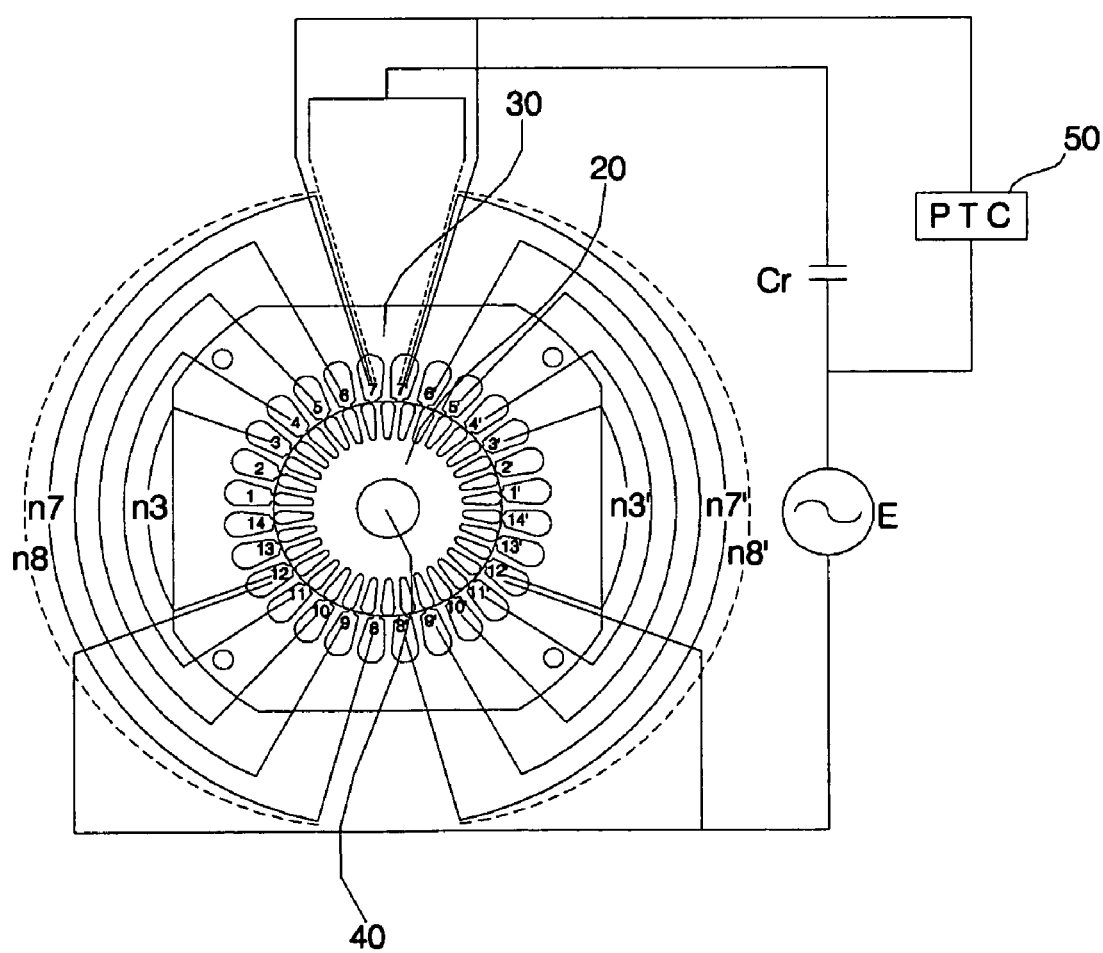
FIG. 6 is a circuit diagram illustrating the connection state of wires of an auxiliary winding of a single-phase induction motor according to the present invention.
Figure 7:
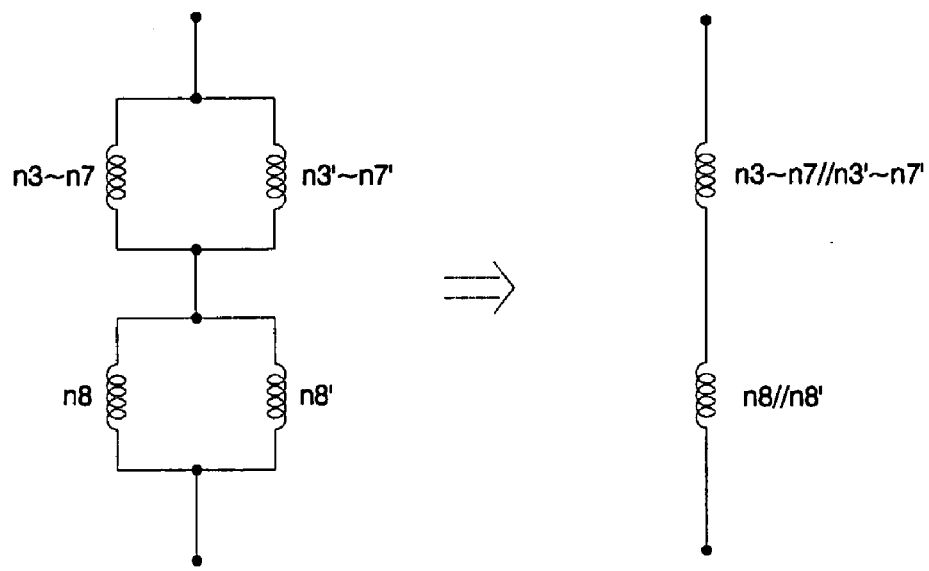
FIG. 7 is an equivalent circuit diagram of the auxiliary winding of FIG. 6.

FIG. 6 is a circuit diagram illustrating the connection state of wires of an auxiliary winding of a single-phase induction motor according to the present invention, and FIG. 7 is an equivalent circuit diagram of the auxiliary winding of FIG. 6.

As shown in FIG. 6, the single-phase induction motor according to the present invention includes a rotor 20, a stator 30 with a number of slots formed therein, and a shaft 40 formed in the rotor 20 to transfer a rotating force to the outside of the motor.

Main and auxiliary windings can be installed on the stator 30 through the slots formed in the stator 30. In the single-phase induction motor shown in FIG. 6, the auxiliary winding is installed in the form of two parallel coils.

As shown in FIG. 6, the auxiliary winding is formed by winding a coil on the stator 30 through a plurality of slots 1–14, 1'–14' formed in the stator 30. The auxiliary winding includes a first auxiliary winding portion denoted by solid lines, and a second auxiliary winding portion denoted by dotted lines, which is formed by additionally winding a coil from the end of the first auxiliary winding portion.

The auxiliary winding is installed in the form of two parallel coils. Specifically, the first auxiliary winding portion includes two coils connected in parallel. The first coil (n3 to n7) of the first auxiliary winding portion is formed by winding turns n3 to n7 on the stator 20 through slots 12, 3, 11, . . . in the named order. The second coil (n3' to n7') is formed by winding turns n3' to n7' on the stator 20 through slots 12', 3', 11', . . . in the named order.

The second auxiliary winding portion also includes two coils connected in parallel. The first coil (n8) of the second auxiliary winding portion, which is additionally connected with the first coil (n3 to n7) of the first auxiliary winding portion, is formed by winding a plurality of turns n8 on the stator 20 through slots 7 and 8 in the named order. The second coil (n8') of the second auxiliary winding portion, which is additionally connected with the second coil (n3' to n7') of the first auxiliary winding portion, is formed by winding a plurality of turns n8' through slots 7' and 8' in the named order.

The end of the first auxiliary winding portion (n3 to n7, n3' to n7') is connected with the end of the second auxiliary winding portion (n8, n8'), preferably through tapping.

As shown in FIG. 6, the auxiliary winding including the first winding (n3–n7, n3'–n7') and the second winding (n8, n8') is formed by winding turns on both sides of the stator through the slots formed in the stator. The two coils of each of the first and second auxiliary winding portions are connected in parallel by connecting both ends of the first coil (n3 to n7) of the first auxiliary winding portion respectively with both ends of the second coil (n3' to n7') thereof, and by connecting both ends of the first coil (n8) of the second auxiliary winding portion respectively with both ends of the second coil (n8') thereof.

As shown in FIG. 7, the two parallel coils of each of the first and second auxiliary winding portions can be represented by one equivalent coil.

According to the present invention, in order to allow the number of turns of the auxiliary winding, through which a current flows, to vary according to the operating mode of the motor, the run capacitor Cr and the PTC 50 are connected to the first and second auxiliary winding portions of the auxiliary winding in the following manner. The run capacitor Cr is connected with a connection line, through which one-side ends (corresponding to the end turns) of the two coils (n8, n8') of the second auxiliary winding portion are connected, so that the run capacitor Cr is connected in series with the second auxiliary winding portion. The PTC 50 is connected with a connection line, through which one-side ends (corresponding to the end turns n7 and n7') of the two coils (n3 to n7, n3' to n7') of the first auxiliary winding portion are connected, so that the PTC 50 is connected in parallel with the run capacitor Cr.

Since the second auxiliary winding portion (n8, n8') is formed by additionally winding a coil from the end of the first auxiliary winding portion (n3 to n7, n3' to n7') and the ends of the first and second auxiliary winding portions are connected through tapping in the above manner, it is possible to change the number of turns of the auxiliary winding according to the operating mode of the motor, thereby allowing the equivalent resistance of the PTC 50 to be low when the motor starts and to be high when the motor runs in normal mode. This improves the start efficiency of the motor when it starts and also improves the operational efficiency of the motor when it runs in normal mode.

Also in this embodiment, instead of the PTC 50, any other variable resistance element, such as the centrifugal switch 51 and the relay 52, which has a low equivalent resistance when the motor starts and has a high equivalent resistance when the motor runs in normal mode, can be used as the subsidiary start device.

Figure 8:
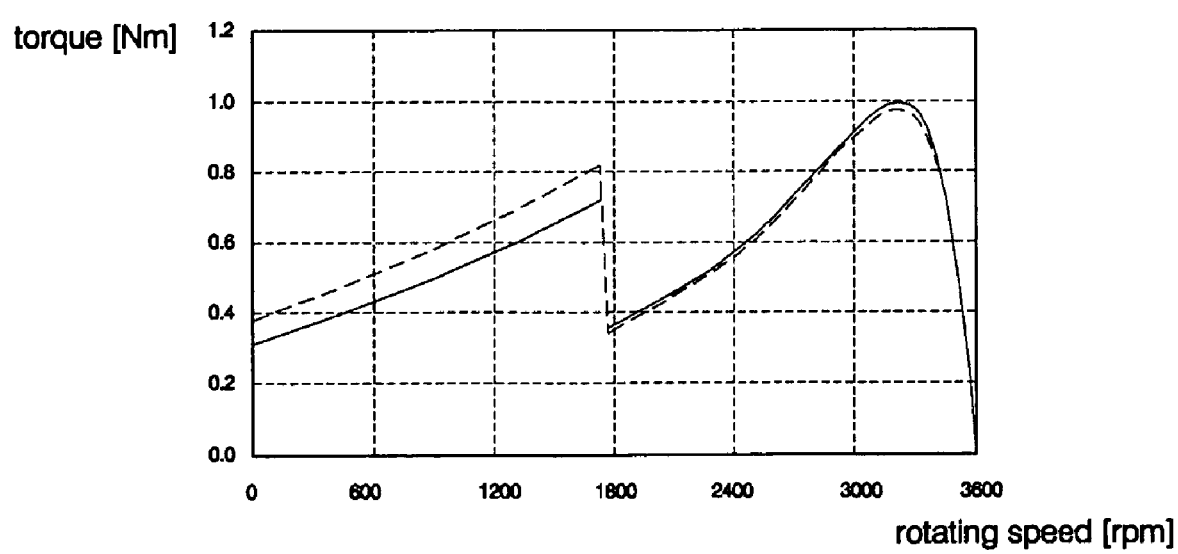
FIG. 8 is a graph illustrating a comparison of start efficiency according to the number of turns of the auxiliary winding.
Figure 9:
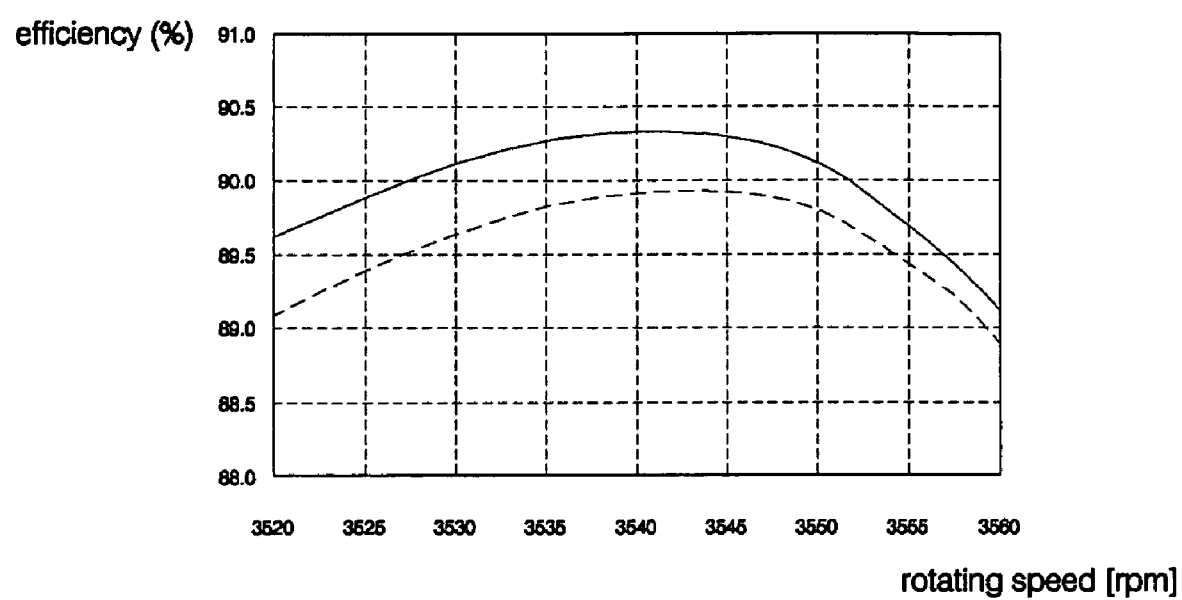
FIG. 9 is a graph illustrating a comparison of operational efficiency of the motor according to the number of turns of the auxiliary winding.

FIG. 8 is a graph illustrating a comparison of start efficiency according to the number of turns of the auxiliary winding, and FIG. 9 is a graph illustrating a comparison of operational efficiency of the motor according to the number of turns of the auxiliary winding.

In FIG. 8, the horizontal axis represents the rotation speed of the rotor in rpm, and the vertical axis represents the start torque in Nm. In FIG. 8, a solid line indicates the start torque of a motor that uses an auxiliary winding with a large number of turns, and a dotted line indicates the start torque of a motor that uses an auxiliary winding with a small number of turns.

In FIG. 9, the horizontal axis represents the rotation speed of the rotor in rpm, and the vertical axis represents the efficiency of the motor in percent. In FIG. 9, a solid line indicates the operational efficiency of a motor that uses an auxiliary winding with a large number of turns, and a dotted line indicates the operational efficiency of a motor that uses an auxiliary winding with a small number of turns.

It can be seen from FIGS. 8 and 9 that, if the motor uses an auxiliary winding having a large number of turns, the motor has a low start torque when it starts and rotates at low speed, but the motor has a high efficiency when it runs in normal mode.

On the other hand, if the motor uses an auxiliary winding having a small number of turns, the motor has a high start torque when it starts and rotates at low speed, but the motor has a low efficiency when it runs in normal mode, compared to when the auxiliary winding has a large number of turns.

As apparent from the above description, the present invention provides a single-phase induction motor that has the following features and advantages. The single-phase induction motor includes an auxiliary winding that includes first and second auxiliary winding portions. The second auxiliary winding portion is formed by additionally winding a coil from the end of the first auxiliary winding portion. A subsidiary start device, whose resistance varies according to the operating mode of the motor, is connected to the end of the first auxiliary winding. Accordingly, the number of turns of the auxiliary winding, through which a current flows, is reduced when the motor starts. On the other hand, the number of turns of the auxiliary winding, through which a current flows, is increased when the motor runs in normal mode. This allows the single-phase induction motor to have satisfactory start and operational efficiencies.

In other words, the single-phase induction motor according to the present invention decreases the number of turns of the auxiliary winding, through which a current flows, when it starts, thereby improving the start performance of the motor. In addition, the single-phase induction motor increases the number of turns of the auxiliary winding, through which a current flows, when it runs in normal mode, thereby improving the operational performance of the motor.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The present disclosure relates to subject matter contained in Korean Application No. 10-2004-0064803, filed on Aug. 17, 2004, the contents of which are herein expressly incorporated by reference in its entirety.

What is claimed is:

1. A single-phase induction motor, comprising:
   a main winding;
   an auxiliary winding including a first auxiliary winding portion and a second auxiliary winding portion;
   a run capacitor, and
   a subsidiary start device,
   wherein the auxiliary winding is configured so that a current flows via the first auxiliary winding portion alone when the motor starts and the current flows via the first auxiliary winding portion and the second auxiliary winding portion when the motor runs in a normal mode.

2. The motor according to claim 1,
   wherein the auxiliary winding is configured so that the number of turns thereof, through which a current flows, is reduced when the motor starts in order to increase the start efficiency of the motor, and the number of turns thereof, through which a current flows, is increased when the motor runs in normal mode in order to increase the operational efficiency of the motor.

3. The motor according to claim 2,
   wherein the auxiliary winding comprises a first auxiliary winding portion and a second auxiliary winding portion, the second auxiliary winding portion being formed by additionally winding a coil from an end of the first auxiliary winding portion.

4. The motor according to claim 3,
   wherein the run capacitor is connected in series with the auxiliary winding, and the subsidiary start device is connected in parallel with both the run capacitor and the second auxiliary winding portion.

5. The motor according to claim 4,
   wherein the subsidiary start device comprises a variable resistance element having a low equivalent resistance when the motor starts and having a high equivalent resistance when the motor runs in normal mode.

6. The motor according to claim 5,
   wherein the subsidiary start device is a Positive Thermal Coefficient (PTC) element.

7. The motor according to claim 5,
   wherein the subsidiary start device is a centrifugal switch.

8. The motor according to claim 5,
wherein the subsidiary start device is a relay.

9. A single-phase induction motor, comprising:
a rotor;
a stator having a plurality of slots formed therein;
and main and auxiliary windings formed on the stator through the slots,
wherein the auxiliary winding is installed in the form of two parallel coils on the stator through the slots, and the auxiliary winding comprises a first auxiliary winding portion and a second auxiliary winding portion, the second auxiliary winding portion being formed by additionally winding a coil from one end of the first winding portion, and a current flows via the first auxiliary winding portion alone when the motor starts and the current flows via the first auxiliary winding portion and the second auxiliary winding portion when the motor runs in a normal mode.

10. The motor according to claim 9,
wherein the auxiliary winding is formed by connecting the first auxiliary winding portion with the second auxiliary winding portion through a tap.

11. The motor according to claim 9, further comprising:
a run capacitor connected in series with the auxiliary winding; and
a subsidiary start device connected in parallel with both the run capacitor and the second auxiliary winding portion.

12. The motor according to claim 11,
wherein the subsidiary start device comprises a variable resistance element having a low equivalent resistance when the motor starts and having a high equivalent resistance when the motor runs in normal mode.

13. The motor according to claim 12,
wherein the subsidiary start device is a Positive Thermal Coefficient (PTC) element.

14. The motor according to claim 12,
wherein the subsidiary start device is a centrifugal switch.

15. The motor according to claim 12,
wherein the subsidiary start device is a relay.

* * * * *